(12) United States Patent
Ejerhed

(10) Patent No.: US 6,810,375 B1
(45) Date of Patent: Oct. 26, 2004

(54) METHOD FOR SEGMENTATION OF TEXT

(75) Inventor: Eva Ingegerd Ejerhed, Stockholm (SE)

(73) Assignee: Hapax Limited, London (GB)

( * ) Notice: Subject to any disclaimer, the term of this patent is extended or adjusted under 35 U.S.C. 154(b) by 1072 days.

(21) Appl. No.: 09/584,135

(22) Filed: May 31, 2000

(30) Foreign Application Priority Data

May 31, 2000 (SE) .............................................. 0002034

(51) Int. Cl.[7] .............................................. G06F 17/28
(52) U.S. Cl. ...................... 704/9; 704/2; 704/4; 704/8; 704/7; 707/5; 707/4; 707/3; 707/6
(58) Field of Search ............................... 704/2, 4, 8, 6, 704/7, 3, 9; 707/3, 4, 5, 6

(56) References Cited

U.S. PATENT DOCUMENTS

| | | |
|---|---|---|
| 4,864,502 A | 9/1989 | Kucera et al. |
| 4,887,212 A | 12/1989 | Zamora et al. |
| 5,146,405 A | 9/1992 | Church |
| 5,479,563 A | 12/1995 | Yamaguchi |

FOREIGN PATENT DOCUMENTS

| | | |
|---|---|---|
| EP | 0 962 873 A1 | 12/1999 |
| EP | 1 020 803 A1 | 7/2000 |
| JP | 10254877 | 9/1998 |

OTHER PUBLICATIONS

Nelson, W. & Kucera, H., "Frequency Analysis of English Usage", 1982, Houghton Mifflin Company, Boston, pp. 549–556.

Grefenstette, G., "Light parsing as finite state filtering", in A. Kornai (Ed), Extended Finite State Models of Language, 1999, Cambridge University Press, Cambridge, U.K., pp. 86–94.

Ramshaw, L. & Marcus, M., "Text chunking using transformation–based learning", in Proceedings of the Third Workshop on Very Larger Corpora, D. Yarowsky & K. Church, Eds, Jun. 1995, M.I.T., Cambridge, Massachusetts, pp. 82–94.

Ejerhed, E., "Finding clauses in unrestricted text by finitary and stochastic methods", in Second Conference on Applied Natural Language Processing, 1988, ACL, Austin, Texas, pp. 219–227.

Ejerhed, E., "Finite State Segmentation of Discourse into Clauses", Natural Language Engineering, 1995, Cambridge University Press, Cambridge, U.K.

Ejerhed, E., "Finite State Segmentation of Discourse into Clauses", in Proceedings of the 12th European Conference on Artificial Intelligence, 1996, John Eiley & Sons, Ltd.

Abney, S. P., "Rapid incremental parsing with repair", in Proceedings of the 6th New OED Conference, 1990, Waterloo, Ontario, University of Waterloo, pp. 1–9.

Karlsson et al, "Constraint Grammar: A language independent system for parsing unrestricted text", 1995, Mouton de Gruyter, Berlin/New York, pp. 186–269.

*Primary Examiner*—Vijay Chawan
(74) *Attorney, Agent, or Firm*—Burns, Doane, Swecker & Mathis, L.L.P.

(57) ABSTRACT

A computerized method, and a corresponding apparatus, for segmentation of a stream of text elements comprising analyzed tokens into one or more initial clauses is disclosed. In the method, a predetermined number of consecutive text elements of said stream of text elements are scanned, starting from a given position. The predetermined number of consecutive text elements are compared with each pattern of a set of patterns for beginnings of initial clauses, and a beginning of an initial clause is identified in the predetermined number of consecutive text elements, if the predetermined number of consecutive text elements match one pattern of the set of patterns for beginnings of initial clauses. The given position is then moved at least one position forward and the scanning, comparison and identification is repeated.

34 Claims, 14 Drawing Sheets

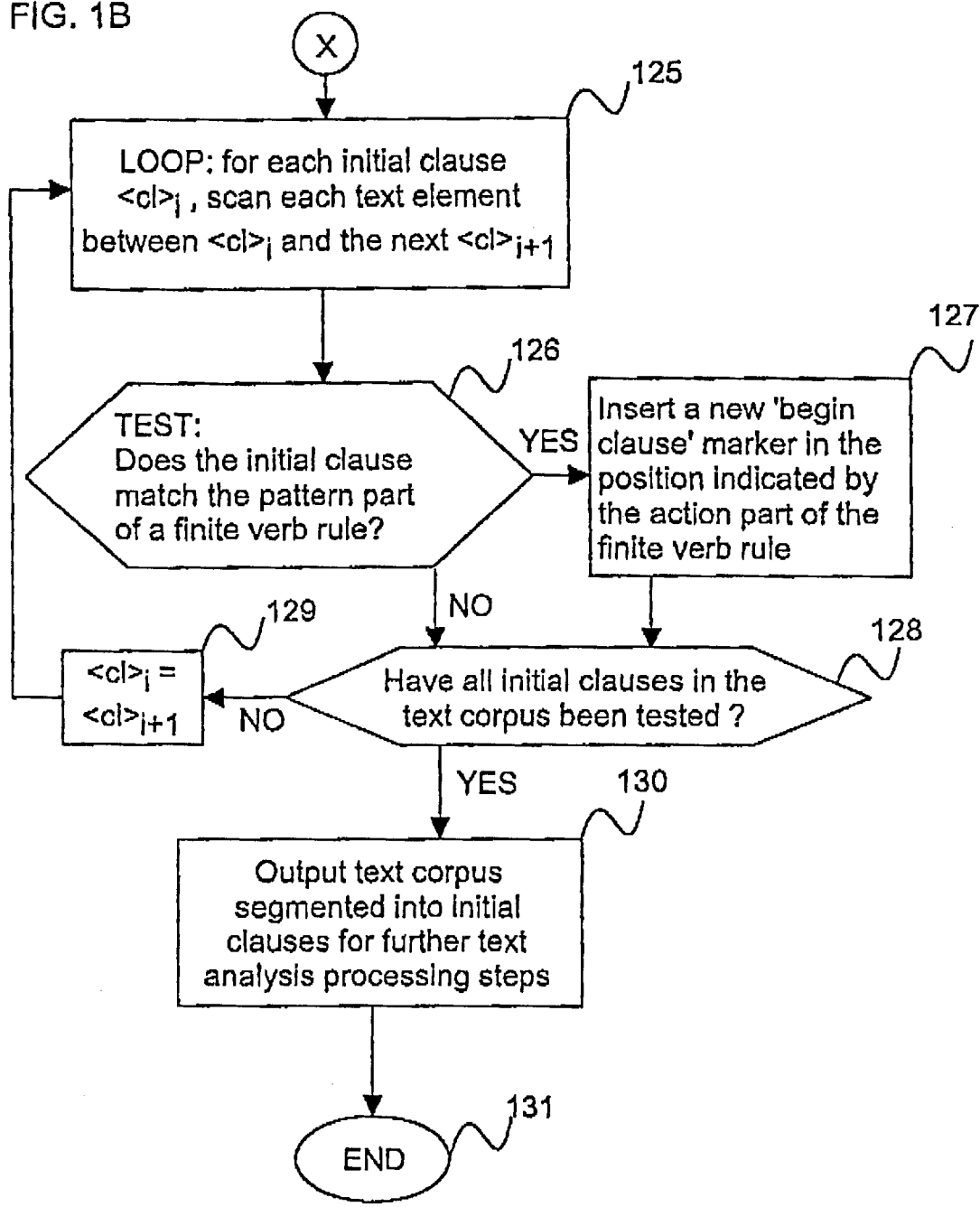

FIG. 3 A

| Pattern | | Action |
|---|---|---|
| 1a | <s> X | <s> <cl> X |
| 1b | <s> X<br>    1.0 | <s> <cl> X |
| 2a | X CS | X <cl> CS |
| 2b | X CS<br>    1.0 | X <cl> CS |
| 3a | X WDT | X <cl> WDT |
| 3b | X WDT<br>    1.0 | X <cl> WDT |
| 4a | X WPS | X <cl> WPS |
| 4b | X WPS<br>    1.0 | X <cl> WPS |
| 5a | , RB MD | , <cl> RB MD |
| 5b | , RB MD<br>  0.9 0.1 | , <cl> RB MD |
| 6a | X WRB | X <cl> WRB |
| 6b | X WRB<br>    1.0 | X <cl> WRB |

FIG. 3 B

| Pattern: | Action: |
|---|---|
| 1a <cl>$_i$ X VB-FIN Y VB-FIN Z <cl>$_j$ | <cl>$_i$ X VB-FIN Y <cl>$_{i+1}$ VB-FIN Z <cl>$_j$ |
| 1b <cl>$_i$ X VB-FIN Y VB-FIN Z <cl>$_j$<br>   0    0        0.3 0.9  0 0 | <cl>$_i$ X VB-FIN Y <cl>$_{i+1}$ VB-FIN Z <cl>$_j$ |

FIG. 4

4A
<s> Officials in Bombay said that oil traffic would be affected less than cargo handling , which is labour-intensive . </s>

4B
<s> Officials/NNS in/IN Bombay/NP said/VBD that/CS oil/NN traffic/NN would/MD be/BE affected/VBN less/RBR than/CC cargo/NN handling/NN , /, which/WDT is/BEZ labour-intensive/JJ ./. </s>

4C
<s>
<cl1> Officials/NNS in/IN Bombay/NP said/VBD
<cl2> that/CS oil/NN traffic/NN would/MD be/BE affected/VBN less/RBR than/CC cargo/NN handling/NN , /,
<cl3> which/WDT is/BEZ labour-intensive/JJ ./.
</s>

4D
<cl1> by rule 1 a , FIG. 3A
<cl2> by rule 2 a , FIG. 3A
<cl3> by rule 3 a , FIG. 3A

FIG. 5

\<s\> Officials in Bombay => \<s\>\<cl\> Officials in Bombay
    0      1  2      3
           in  Bombay  said
           1  2      3    4
               Bombay  said  that => Bombay said \<cl\> that
               2       3    4     5
                     said  that  oil
                     3    4     5   6
                        that  oil  traffic
                        4    5   6      7
                           oil  traffic  would
                           5  6     7      8
                              traffic  would  be
                              6      7     8   9
                                  would  be  affected
                                  7      8    9        10
                                         be  affected
                                        8   9        10
                                              affected
                                        9        10
                                                     10

10
   less
10    11
   less    than
10    11     12
   less    than   cargo
10    11     12     13
        than   cargo  handling
       11     12     13       14
            cargo  handling     ,
            12     13       14   15
                  handling    , which => handling , which
                    13       14  15    16
                          , which  is
                        14  15    16  17
                            which  is  labour-intensive
                            15    16  17          18
                                  is  labour-intensive   .
                              16  17            18  19
                                    labour-intensive   . \</s\>
                                    17                  18  19

FIG. 7

7A
<s>Many people who are searching for information , often can not ask for what they need . </s>

7B
Many/AP people/NNS who/WPS are/BER searching/VBG for/IN information/NN , /, often/RB can/MD not/* ask/VB for/IN what/WDT they/PPSS need/VB . /. </s>

7C
<s>
<cl1> Many/AP people/NNS
<cl2> who/WPS are/BER searching/VBG for/IN information/NN , /,
<cl3> often/RB can/MD not/* ask/VB for/IN
<cl4> what/WDT they/PPSS need/VB . /.
</s>

7D
<cl1> by rule 1 a , FIG. 3A
<cl2> by rule 4 a , FIG. 3A
<cl3> by rule 5 a , FIG. 3A
<cl4> by rule 3 a , FIG. 3A

FIG. 8

```
<s>  Many  people  who    =>   <s>  <cl>  Many  people  <cl>  who
 0    1     2     3
      people  who  are
        1     2    3    4
              who  are  searching
               2    3      4        5
                   are  searching  for
                    3      4        5    6
                        searching  for  information
                           4        5    6         7
                                   for  information
                                    5    6         7
                                        information
                                         6         7
                                                   7

7
,
7 8
  , often
  7 8   9
  , often  can   =>   ,  <cl>  often  can
  7 8     9   10
      often  can  not
        8    9   10   11
             can  not  ask
              9  10   11  12
                  not  ask  for
                  10   11  12  13
                       ask  for  what  =>  ask  for  <cl>  what
                       11   12  13   14
                            for  what  they
                            12   13   14    15
                                 what  they  need
                                  13   14    15    16
                                       they  need  .
                                        14    15   16 17
                                             need  .   </s>
                                              15   16  17
```

FIG 10

10A
<s> I found that documents which I might have comfortably handed a client as good answers to his question were not as useful to me when I was the seeker of information . </s>

10B
<s> I/PPSS found/VBD that/CS documents/NNS which/WDT I/PPSS might/MD have/HV comfortably/RB handed/VBN a/AT client/NN as/IN good/JJ answers/NNS to/IN his/PP$ question/NN were/BED not/* as/QL useful/JJ to/IN me/PPO when/WRB I/PPSS was/BEDZ the/AT seeker/NN of/IN information/NN ./. </s>

10C
<s>
<cl1> I/PPSS found/VBD
<cl2> that/CS documents/NNS
<cl3> which/WDT I/PPSS might/MD have/HV comfortably/RB handed/VBN a/AT client/NN as/IN good/JJ answers/NNS to/IN his/PP$ question/NN were/BED not/* as/QL useful/JJ to/IN me/PPO
<cl4> when/WRB I/PPSS was/BEDZ the/AT seeker/NN of/IN information/NN ./.
</s>

10D
<cl1> by rule 1a, FIG. 3A
<cl2> by rule 2a, FIG. 3A
<cl3> by rule 3a, FIG. 3A
<cl4> by rule 6a, FIG. 3A 10E
<s>
<cl1> I/PPSS found/VBD
<cl2> that/CS documents/NNS
<cl3a> which/WDT I/PPSS might/MD have/HV comfortably/RB handed/VBN a/AT client/NN as/IN good/JJ answers/NNS to/IN his/PP$ question/NN
<cl3b> were/BED not/* as/QL useful/JJ to/IN me/PPO
<cl4> when/WRB I/PPSS was/BEDZ the/AT seeker/NN of/IN information/NN ./.
</s>

10F
<cl3b> by rule 1a, FIG. 3B

<cl1> I/PPSS found/VBD

<cl2> that/CS documents/NNS

<cl3> which/WDT I/PPSS might/MD have/HV comfortably/RB handed/VBN a/AT client/NN as/IN good/JJ answers/NNS to/IN his/PP$ question/NN were/BED not/* as/QL useful/JJ to/IN me/PPO =>

<cl3a> which/WDT I/PPSS might/MD have/HV comfortably/RB handed/VBN a/AT client/NN as/IN good/JJ answers/NNS to/IN his/PP$ question/NN <cl3b> were/BED not/* as/QL useful/JJ to/IN me/PPO <cl4> when/WRB I/PPSS was/BEDZ the/AT seeker/NN of/IN information/NN ./.

</s>

METHOD FOR SEGMENTATION OF TEXT

FIELD OF THE INVENTION

The present invention relates to the field of fully automated, linguistic analysis of unrestricted text in different languages. Specifically, the present invention relates to an automatic method, and a corresponding apparatus, for segmentation of a stream of text elements comprising analyzed tokens into one or more initial clauses.

BACKGROUND OF THE INVENTION

Although current technology for parsing whole sentences in unrestricted text has improved in recent years, the level of parsing accuracy is still not sufficient to support long intended applications of parsing technology to information systems. For example, existing information systems cannot extract from unrestricted text specific pieces of information that are parallel in lexical, constructional and semantic respects.

Examples of parallel pieces of information are portions of text that have the same agent (=grammatical subject), or the same acted upon (=grammatical object), or involve the same action (=content verb). Such extraction of information is currently only possible from texts in restricted domains. This is due to the fact that commonly used mtchods for information extraction crucially depend on manually acquired, domain specific world knowledge. Consequently, there are large and growing bodies of texts that contain valuable pieces of information that cannot be accessed by standard techniques of information retrieval, because the latter are currently restricted to retrieval of whole documents.

One principal reason why current parsing technology fails to achieve the accuracy required for large-scale applications to unrestricted text is the well-known observation in the art that the performance of parsers degrades as the length of input sentences increases. This is due to the fact that parsers target full sentences as the units to parse. As the length of a sentence increases, so does the combinatorial explosion of alternative ways to combine the well-formed substrings of a sentence that the parser has found.

In order to improve the coverage and accuracy of parsers for unrestricted text, a new divide and conquer strategy is emerging in parsing. The strategy involves the use of simple, finite state parsing techniques in a phase that is preparatory to 'real' parsing, which uses more complex techniques. The object of the preparatory stage is to partition text exhaustively into a sequence of units referred to as chunks or segments, in order to facilitate and improve later processing.

Clause segmentation is emerging as a recognized problem area. However, there is no agreement among practitioners in the field on the definition of the clauses that should result from clause segmentation, or on terminology. Units that are clauses or 'clause like' are referred to by many different names.

For the purpose of the discussion in this background section, a simple clause is a unit of information that roughly corresponds to a simple proposition, or fact. Current information retrieval technology is not based on clauses as units of information that can be used in rapid creation of databases of reported facts, that involve agents and actions of interest to end-users of information systems. An important motivation for clause segmentation is that it enables automatic recognition of basic grammatical relations within clauses (subject, object, etc). Because of this, clause segmentation makes it possible for later processes to determine which pieces of text exhibit lexical, constructional and semantic parallelism of information.

Existing methods for identifying clauses and segmenting text into clauses rely on first finding phrases within sentences, such as noun phrases and other phrases, before finding clause units within sentences. When clause units have been found, they make it possible to determine clause boundaries, i.e. where a clause begins and ends.

In Nelson, W. & Kucera, H., "Frequency Analysis of English Usage", 1982, Houghton Mifflin Company, Boston, pp. 549–556, hereafter Nelson&Kucera-1982, Kucera used a finite state automaton for finding verb groups in part-of-speech tagged text in the Brown corpus, and for classifying verb groups into finite and non-finite. A verb group is finite if it contains a verb in the present or past tense. A verb group is non-finite if it contains no tensed verb, i.e. if it consists of an infinitive or a present or past participle. It is commonly agreed in traditional and modern grammar that a verb group implies a predication, equivalently a clause, and that finite and non-finite predications are syntactically distinct, though related types of predications.

The disadvantage of Kucera's 1982 finite state automaton is that it does not address the problem of identifying the location of boundaries between predication units, i.e. it is not a method that segments text into predication units. Although a subsequent patent entitled 'Sentence analyzer' to Kucera et al (U.S. Pat. No. 4,864,502) indirectly locates clause boundaries, this technique is based on first finding phrases within sentences, followed by identification of clauses, and thereafter clause boundaries.

Other techniques that analyze sentences internally first, before locating clause boundaries are known, for example: Grefenstette, G., "Light parsing as finite state filtering", in A. Kornai (Ed), Extended Finite State Models of Language, 1999, Cambridge University Press, Cambridge, U.K., pp. 86–94; and Ramshaw, L. & Marcus, M., "Text chunking using transformation-based learning", in Proceedings of the Third Workshop on Very Large Corpora, D. Yarowsky & K. Church, Eds, June 1995, M.I.T., Cambridge, Mass., pp. 82–94. These techniques use finite state marking transducers on part-of-speech tagged text as input. The marking transducers mark both contiguous groups of nouns and contiguous groups of verbs in the output. A sentence is implicitly equated with a predication, which is assumed to be a combination of one verb group with one or more noun groups.

A serious problem with the approach is that it gives bad results for sentences that consist of several clauses. The reason is that group marking transducers typically do not recognize sentence internal clauses as clausal units.

There are other known techniques for clause segmentation, described in: Ejerhed, E., "Finding clauses in unrestricted text by finitary and stochastic methods", in Second Conference on Applied Natural Language Processing, 1988, ACL, Austin, Tex., pp. 219–227, and in Abney, S. P., "Rapid incremental parsing with repair", in Proceedings of the 6th New OED Conference, 1990, Waterloo, Ontario, University of Waterloo, pp. 1–9. For Ejerhed's and Abney's techniques, the input to the recognition of clause segments consists of part-of-speech tagged text, in which basic noun phrases have also been recognized by probabilistic techniques as described by U.S. Pat. No. 5,146,405 to Church. A problem for both of these two techniques is the following. If the recognition of a basic noun phrase is not correct, then this may result in an error in clause segmentation. For example, if a long noun phrase that has been recognized really should be analyzed as two noun phrases, then a possible clause boundary location is inaccessible.

In the framework of Constraint Grammar, there is also a module for detecting sentence internal clause boundaries, described in Karlsson et al, "Constraint Grammar: A language independent system for parsing unrestricted text", 1995, Mouton de Gruyter, Berlin/New York, pp. 1–430. However, the authors report (on pages 213, 238) that the mechanism for identifying sentence internal clause boundaries is problematic and rather unsophisticated, and as a result, the other modules of constraint syntax to a great extent have to do without it.

SUMMARY OF THE INVENTION

An objective of the present invention is to provide an improved method for clause boundary detection and segmentation of unrestricted text into clauses, that is not subject to the foregoing disadvantages of existing methods for these tasks.

The invention is based on the recognition that an unrestricted text can be segmented into initial clauses using a method whose number of computations only increases linearly with the number of text elements in the text to be segmented. Furthermore, the proposed method according to the invention, in spite of its restricted number of computations, gives rise to a segmentation into initial clauses that is surprisingly useful in applications, such as automatic extraction of information from unrestricted text using a computer.

According to one aspect of the present invention a method for segmentation of a stream of text elements comprising analyzed tokens into one or more initial clauses is provided. According to the method a predetermined number of consecutive text elements of the stream of text elements are scanned, starting from a given position. The predetermined number of consecutive text elements are compared with each pattern of a set of patterns for beginnings of initial clauses. Furthermore, if said predetermined number of consecutive text elements match one pattern of said set of patterns for beginnings of initial clauses, a beginning of an initial clause is identified in said predetermined number of consecutive text elements. The scanning, comparison and identification is then repeated, wherein the given position is moved at least one position forward between each repetition.

By moving the given position at least one position forward between each repetition, the number of times the scanning, comparison and identification are made increases linearly with the number of text elements in the stream of text elements to be segmented. Furthermore, it has been shown that the segmentation resulting from the method according to the invention facilitates subsequent, automated information extraction from unrestricted text to an extent that previously has been anticipated not to be possible with such methods. This is due to the recognition of the empirical fact that the location of a clause beginning in any language is decidable on the basis of iteratively inspecting a predetermined number of consecutive text elements. Either the predetermined number of text elements contain a sequence that is a clause beginning according to a short language specific list of such sequences, or it does not. Furthermore, it is also due to the recognition of the distributional fact that the restrictions on co-occurrence of content words within clauses are numerous and strong, whereas the restrictions on co-occurrence of content words across clause boundaries are fewer and weaker. For this reason, an initial clause fulfills the requirement of being a maximally independent processing unit. This can be utilized by an incremental sentence processing model based on the invention.

One distinctive feature of the method according to the invention is that it reverses the order used in all prior art of first doing sentence internal parsing, before recognizing clauses and clause boundaries. Instead, the method of the invention first recognizes clause boundaries in text that has only been part-of-speech tagged and not parsed, before doing clause internal parsing. This reversal of order of processing improves the accuracy and robustness of clause boundary detection in that dependence on prior processing steps is minimized. The reversal is manifested in that the input to the method according to the inventions is a stream of text elements comprising analyzed tokens. Thus, the pre-analysis of an unrestricted text that gives rise to the stream of text elements is limited to an analysis at the level of individual word tokens, including punctuation tokens.

Another distinctive feature of the invention is that the clause boundaries that are recognized early in a sequence of text analysis steps are boundaries of linguistic units that are here termed initial clauses. Initial clauses have the property of being non-recursive, i.e. no two initial clauses overlap each other.

In one embodiment of the method according to the invention, a marker for begin initial clause is inserted into said predetermined number of consecutive text elements in response to an identified beginning of an initial clause in the step of identifying. This has the advantage that it simplifies subsequent analysis of the segmented text. However, it is to be noted that any other way of indicating in the segmented text the clause boundaries, such as having a pointer pointing at the locations of initial clause beginnings, is equally applicable.

Furthermore, in the above embodiment, each pattern of said set of patterns is preferably associated with an action and the marker for begin initial clause is inserted into the predetermined number of consecutive text elements in accordance with the action associated with the pattern that the predetermined number of consecutive text elements match. Furthermore, the action preferably determines in which position of the predetermined number of consecutive text elements the marker for begin initial clause is to be inserted.

To further facilitate subsequent analysis of the segmented text resulting from the method according to the invention, one embodiment of the method includes the indication, for each marker for begin initial clause, of which pattern of said patterns for beginnings of initial clauses caused the insertion of the marker.

According to another embodiment of the invention, an additional set of steps are performed for each of the initial clauses. According to this embodiment, the text elements of each initial clause are scanned and compared with each pattern of a met of patterns for multiple finite verbs. If the text elements of an initial clause match one pattern for multiple finite verbs, a beginning of an initial clause is identified in the text elements of this initial clause. This embodiment of the method according to the invention enhances the resulting segmented text even further in terms of its applicability to subsequent, automated information extraction from unrestricted text and the like.

The method of clause segmentation according to the invention can be used directly to improve the speed and accuracy of sentence processing in text analysis systems for unrestricted text.

BRIEF DESCRIPTION OF THE DRAWINGS

In the following, the present invention is illustrated by way of example and not limitation with reference to the accompanying drawings, in which:

FIG. 1A and 1B are flowcharts that together illustrate a method of segmenting text into initial clauses (i-clauses) in accordance with one embodiment of the invention;

FIG. 3A and 3B provides illustrative examples of rules used in the step of segmenting English text into initial clauses (i-clauses);

FIG. 4A–4D illustrate the derivation of initial clause segments for a first example sentence without self-embedding, showing text analysis steps and rules applied;

FIG. 5 illustrates the derivation of initial clause segments for the first example sentence, showing iterative scanning and rule application;

FIG. 7A–7D illustrate the derivation of initial clause segments for a second example sentence with self-embedding, showing text analysis steps and rules applied;

FIG. 8 illustrates the derivation of initial clause segments for the second example sentence, showing iterative scanning and rule application;

FIG. 10A–10F illustrate the derivation of initial clause segments for a third example sentence, showing text analysis steps and rules applied;

FIG. 11 illustrates the derivation of initial clause segments for the third example sentence, showing iterative scanning and rule application;

DETAILED DESCRIPTION OF THE INVENTION

Figure 1A:
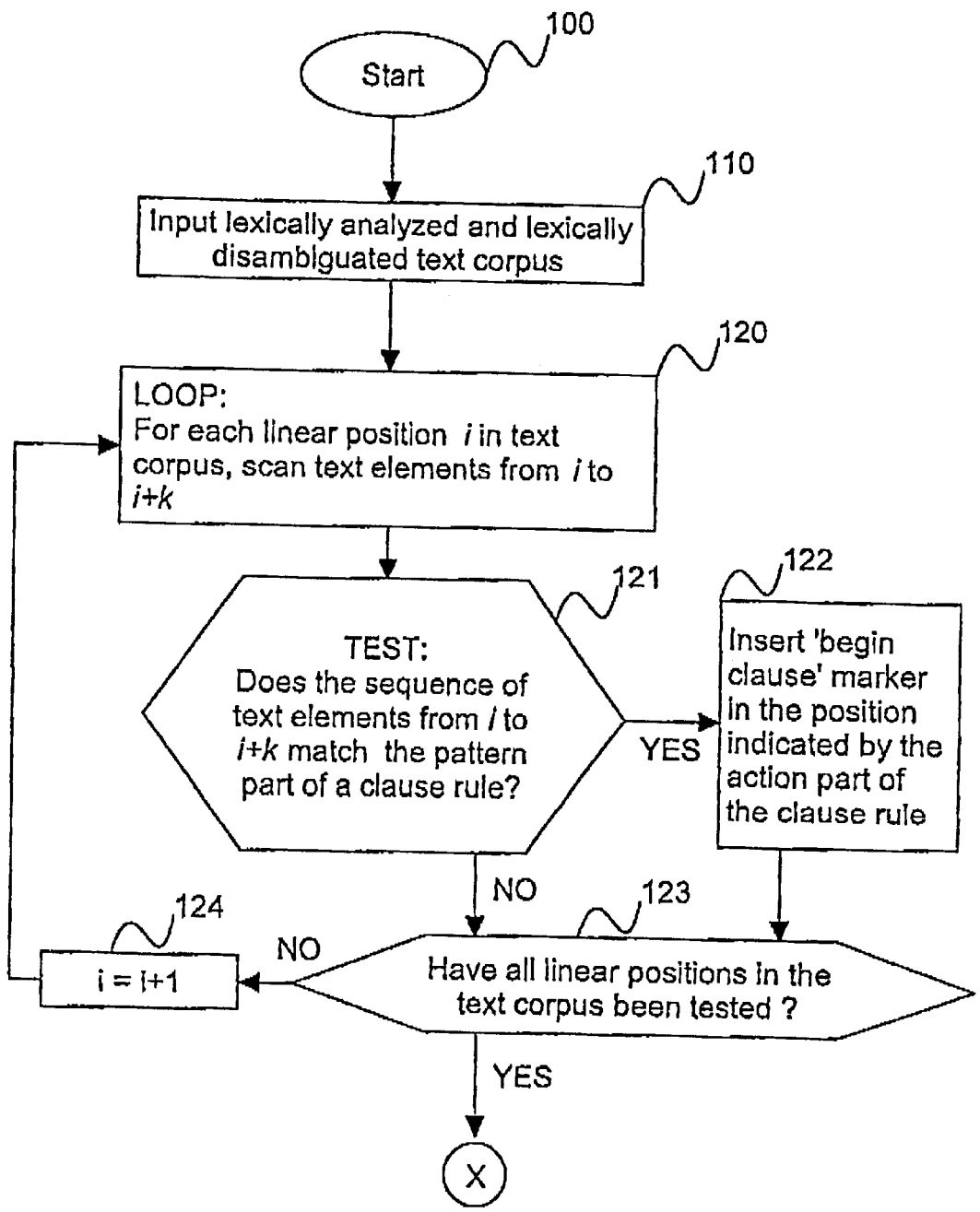
Figure 2:
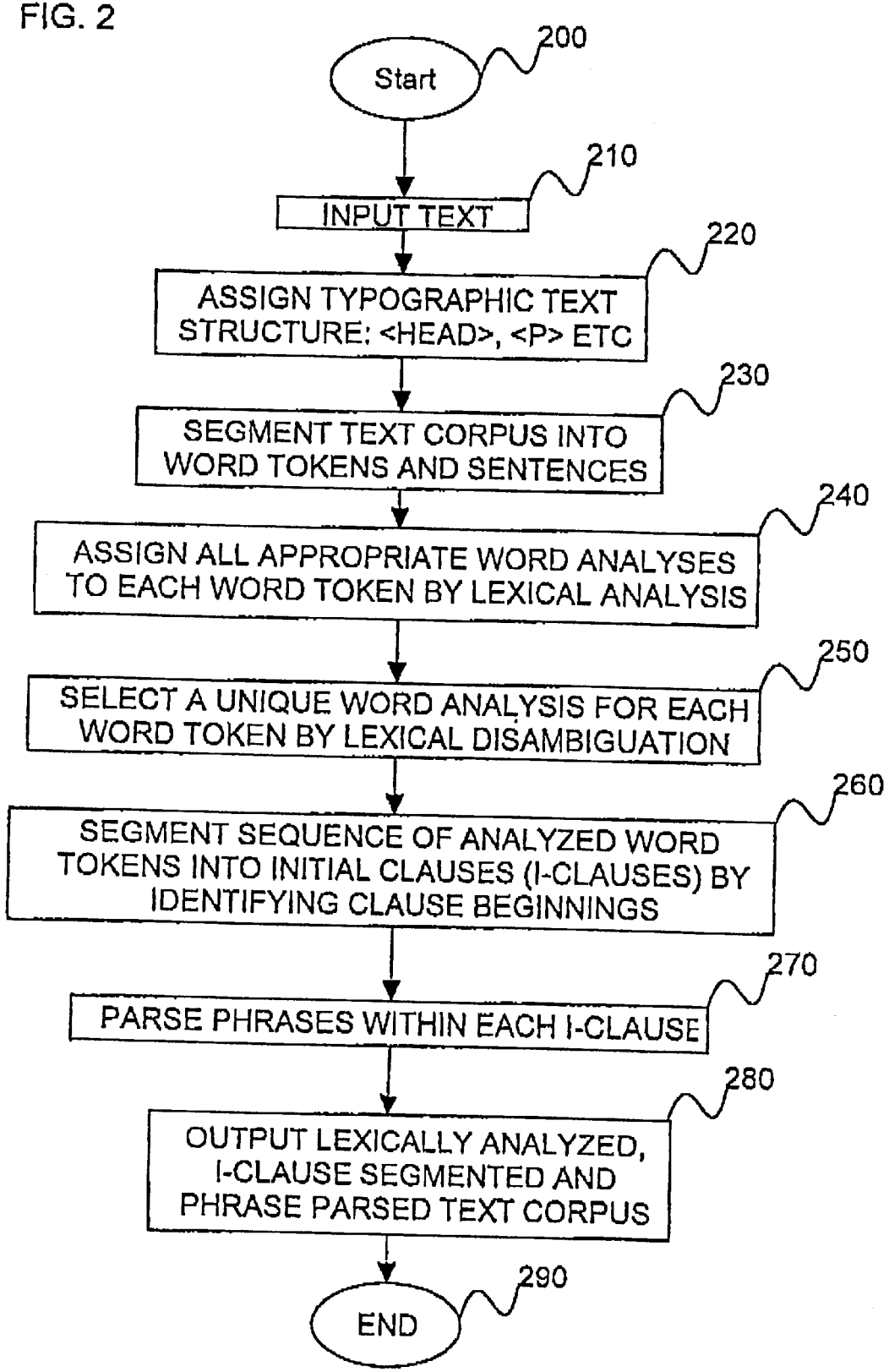
FIG. 2 illustrates the position of the step of segmenting text into initial clauses (i-clauses) in a sequence of text analysis steps.

FIG. 1A and 1B provides a detailed flowchart of the processing step of segmenting text into initial clauses in accordance with one embodiment of the present invention. The position of this clause segmentation step in an example of a larger sequence of text analysis steps is indicated in FIG. 2 as step 260.

In step 110 a lexically analyzed and lexically disambiguated text corpus is input in the form of a stream of text elements comprising analyzed tokens. In addition to word tokens, the stream of text elements includes unique tags for part-of-speech and inflection assigned to each word token, including punctuation tokens, and it may include text structure markers, such as <s> for begin sentence and </s> for end sentence.

In FIG. 1A steps 120–124 forms a loop where the text corpus is exhaustively segmented into initial clauses. In step 120 a predetermined number k of consecutive text elements of the input stream of text elements are scanned from a linear position i to i+k. The term linear position used in step 120 of FIG. 1A refers to the linear position between word tokens in a text corpus. For example, all linear positions in a text corpus may be consecutively numbered from 0 to n. The index that represents an analyzed text corpus can assign locations to any unit of consecutive text elements in a text corpus. The units can be single tokens, phrases, initial clauses, sentences, paragraphs, on up to whole documents. The locations for a given unit are provided by a set of pairs of integers, where each pair of integers represents one span between the two linear positions that the unit occupies in the text corpus.

The expression "pattern part of a clause rule" in 121 of FIG. 1A refers to a sequence of word tokens, including punctuations that unambiguously indicate the beginning of a new clause. The clause segmentation step 121 consults a short, language specific list of clause rules, of which illustrative examples are given in FIG. 3A. Each rule has a pattern part that is a diagnostic pattern for a clause beginning, and an associated action part that indicates the position in which a clause boundary is to be inserted. The clause rules are lexico-syntactic patterns. They can either refer to the individual lexical identity (lemma) of a text element in the sequence, which is useful in the case of some function words, or to the morpho-syntactic description (part-of-speech+inflection information) of a text element, which is useful in the case of content words. The rules can also refer to the presence of a text structure marker at a linear position, such as <s> for 'begin sentence', or <p> for 'begin paragraph'. If the predetermined number k of sequential text elements, from linear position i to linear position i+k, that are scanned in 120 match the pattern part of a clause rule in the test stop 121, then a 'begin clause' marker is inserted, in step 122, In the position indicated by the action part of the matching rule. If a sequence of text elements, from linear position i to linear position i+k, that are scanned in 120 do not match the left hand side of any clause rule in the test step 121 no insertion is made. After the test in step 121, and the insertion in step 122 if any, a test is performed in step 123 if all linear positions in the input text corpus have been tested. If the answer is yes, the process is continued in step 125 of FIG. 1B. If the answer is no, the scanning window is advanced from i to i+1 in step 124 to the next linear position i+1, and the process is continued in step 120. In this way the scanning and testing is repeated until all linear positions in the text corpus have been tested. To speed up the process the scanning window may be advanced more than one linear position in step 124.

In FIG. 1B a set of steps are performed in order to enhance the segmentation of the text corpus. Steps 125–129 form a loop in which all initial clauses found in steps 120–124 of FIG. 1A are segmented into a new set of initial clauses in accordance with the rules for multiple finite verbs, of which rules illustrative examples are given in FIG. 3B. In step 125 the text elements of an initial clause i are scanned, i.e. the text elements from a marker $<cl>_i$ for the beginning of the initial clause i to a marker $<cl>_{i+1}$ for the beginning of a next initial clause i+1. If the text elements of the initial clause i that are scanned in 125 match the pattern part of a rule in a test step 126, then a 'begin clause' marker is inserted, in step 127, in the position indicated by the action part of the matching rule. If the text elements of the initial clause i that are scanned in 125 do not match the pattern part of any rule in the test stop 126 no insertion is made. After the test in step 126, and the insertion in step 127 if any, a test if all initial clauses have been tested is performed in step 128. If the answer is yes, the process is ended. If the answer is no, the initial clause to be scanned is advanced from the initial clause i to the next initial clause i+1 in step 129. After step 129 the process is continued in step 125 for the next initial clause i+1. In this way the scanning and testing is repeated until all initial clauses resulting from steps 120–124 of FIG. 1A have been tested.

What FIG. 2 shows is the sequence of bottom-up, form-based text analysis steps, in order to indicate the position in this sequence of the step of segmenting text into initial clauses (i-clauses) detailed in FIG. 1.

Step 210 of FIG. 2 comprises input of a text corpus, such as a collection of articles, documents, or web pages. In step 220, the input text is optionally assigned typographically driven text structure by being segmented into a sequence of paragraph elements such as <head>, and <p>. In step 230, the stream of characters and blanks that make up the text are segmented into discrete word tokens, which can optionally be further grouped into a sequence of discreto orthographic sentences, Word tokens include ordinary words, numerical expressions, and punctuation marks, The recognition of an orthographic sentence is based on a sequence of word tokens that ends with a sentence final punctuation. In step 240, each word token undergoes lexical analysis and is either assigned a set of alternative lexical analyses, in the case of ambiguous words such as 'wind' noun, or 'wind' verb, or a single lexical analysis, in the case of unambiguous words such as 'from' proposition. In step 250, called lexical disambiguation (or part-of-speech tagging, or simply tagging) a unique lexical analysis is determined for each word token by a statistical process of tri-gram tagging that selects the most likely lexical analysis for each token, given the two preceding tokens and their lexical analyses. A lexical analysis minimally consists of a description of the part-of-speech and inflectional form of the token (also called a morphosyntactic description), and the lemma of the token (also called the base form, or dictionary citation form). In addition to this information, a lexical analysis may also contain other information about a word token, such as information about its pronunciation, its internal morphological decomposition and structure, and its membership in distributional equivalence classes. It is to be noted that this is merely an example of how the steps preceding the method according to the invention are performed. Alternative ways of performing these steps are readily apparent to the skilled person.

Step 260 of FIG. 2, is the step of initial clause segmentation, shown in detail in FIG. 1A and 1B. The subsequent step 270 processes initial clauses internally by recognizing and labeling phrases within each initial clause, by rule based or statistical methods, and step 280 outputs the results of steps 210–270, In the following, the pre-analysis and the segmentation according to the invention of three example sentences will be described. Throughout, the description and in the drawings, a number of abbreviations for Brown corpus tags are used. These abbreviations are as follows: CS=subordinating conjunction, WDT=wh-determiner, WPS=nominative wh-pronoun, RB=adverb, MD=modal auxiliary, NNS=plural noun, IN=preposition, NP=singular proper noun, VBD=verb, past tense, NN=singular noun, BE=be, VBN=verb, past participle, RBR=comparative adverb, CC=coordinting conjunction, BEZ=is, JJ=adjective, AP=post-determiner, BER=are, VBG=verb, present participle, VB=verb, base form, PPSS=nominative pronoun, not $3^{rd}$ person singular, HV=have, AT=article, PP$= possessive personal pronoun, BED=were, QL=qualifier, BEDZ=was, PPO=objective personal pronoun, WRB=wh-adverb, *=not, ,=comma, .=period.

In FIG. 3A and 3B examples of rules are given. The rules in FIG. 3A are associated with the test made in step 121 of FIG. 1A and the rules in FIG. 3B are associated with the test made in stop 126 of FIG. 1B. Each rule of FIG. 3A and 3B is divided into a pattern part in the left column and an associated action part in the right column. The pattern part is a sequence of text elements, where a text element is either a word token, or some information associated with a token, or a text structure marker. X is a variable ranging over word tokens. The action part defines in which position of a sequence of text elements a marker for begin clause is to be inserted if a match with a corresponding pattern has been made. In FIG. 3A there are two different alternatives for the rules 1–6, which are denoted 1a–6a and 1b–6b, respectively. The first alternative, i.e. rules 1a–6a in FIG. 3A and rule 1a in FIG. 3B, relates to a rule based method of associating actions to rules. In this case the position in which a marker for begin clause is to be inserted if a match with a corresponding pattern has been made, is determined by a rule. The second alternative, i.e. rules 1b–6b in FIG. 3A and rule 1a in FIG. 3B, relates to a probabilistic method of associating actions to rules. In this case the position in which a marker for begin clause is to be inserted if a match with a corresponding pattern has been made, is determined in accordance with the probability for each position that there is a clause boundary in this position in such a way that the most probable position is selected. These probabilities are indicated under each of the pattern parts of the rules 1b–6b in FIG. 3A and rule 1b in FIG. 3B. The probabilities may be obtained using bi-gram where the frequency of the presence of a clause boundary between two tokens has been determined empirically. However, bi-grams only take two words into consideration when obtaining the probabilities, which in some cases is not sufficient. Thus, the probabilities are preferably obtained using n-grams, where n is 2 or more. For n-grams not only the two tokens contiguous to the possible clause boundary are taken into consideration when determining the probability of the possible clause boundary, but n consecutive tokens. For example, when obtaining the probability that there is a clause boundary between the first and second token of a sequence of three tokens, using tri-grams, not only the first and second token would be taken into consideration but also the fact that the third token succeeds the second token.

FIGS. 4A–C, 5, and 6 provide different views of the initial clause segmentation of a first example sentence, which is an example of a multi-clausal English sentence without self-embedding.

In FIG. 4A and 4B, the first example sentence is shown as it is output from the pre-analyzing steps of tokenization 230 and disambiguation 250, respectively. The output from disambiguation serves as input to the method illustrated in the flowchart of FIG. 1A.

In FIG. 4C and 4D, the first example sentence is shown as it is output from the method illustrated in the flowchart of FIG. 1A and the rules used for each of the resulting initial clauses, respectively.

FIG. 5 illustrates the derivation of initial clause segments for the first example sentence, showing iterative scanning and rule application. Each row in the figure corresponds to one iteration of steps 120–124 of FIG. 1A. Each time the text elements on a row match a pattern in FIG. 3A this is indicated in bold. Also indicated on the row where a match has been found is the resulting insertion of a marker for begin clause <cl> in the position determined by the action associated with the matching pattern. For example, on the first row the sequence of text elements '<s> officials' match rule 1 of FIG. 3A, and the action associated with this rule is to insert the marker for begin clause between the text elements '<s>' and 'Officials'.

Figure 6:
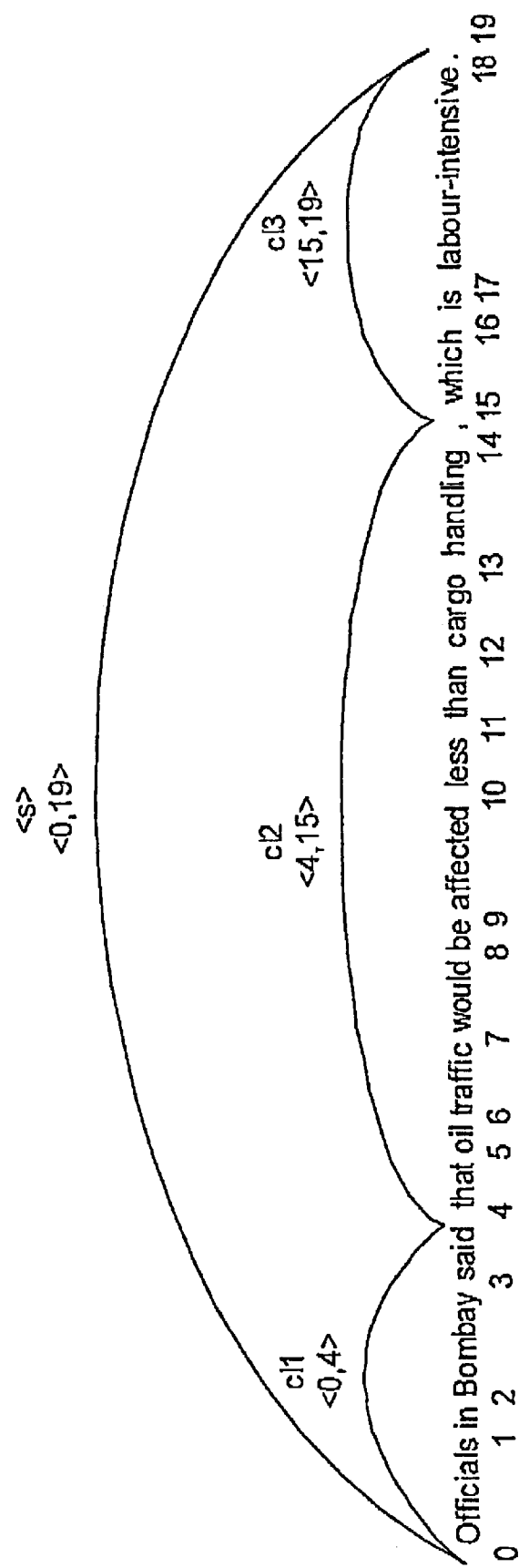
FIG. 6 is a graph illustrating the initial clause segments for the first example sentence that are the result of performing the steps in FIG. 1A.

FIG. 6 is a graph illustrating the clause segments for the first example sentence that are the result of performing the stems in FIG. 1A.

FIGS. 7A–7D, 8, and 9 provide different views of the initial clause segmentation of a second example sentence, which is an example of a multi-clausal English sentence with self-embedding.

In FIG. 7A and 7B, the second example sentence is shown as it is output from the pre-analyzing steps of tokenization 230 and disambiguation 250, respectively. The output from disambiguation serves as input to the method illustrated in the flowchart of FIG. 1A.

In FIG. 7C and 7D, the second example sentence is shown as it is output from the method illustrated in tho flowchart of FIG. 1A and the rules used for each of the resulting initial clauses, respectively.

FIG. 8 illustrates the derivation of initial clause segments for the second example sentence, showing iterative scanning and rule application. Each row in the figure corresponds to one iteration of steps 120–124 of FIG. 1A. Each time the text elements on a row match a pattern in FIG. 3A this is indicated in bold. Also indicated on the row where a match has been found is the resulting insertion of a marker for begin clause <cl> in the position determined by the action associated with the matching pattern. For example, on the first row the sequence of text elements '<s> Many' match rule 1 of FIG. 3A, and the action associated with this rule is to insert: the marker for begin clause between the text elements '<s>' and 'Many'. Furthermore, on the first row the text element 'who' matches rule 4 of FIG. 3A, and the action associated with this rule is to insert the marker for begin clause before the text element 'who'.

Figure 9:
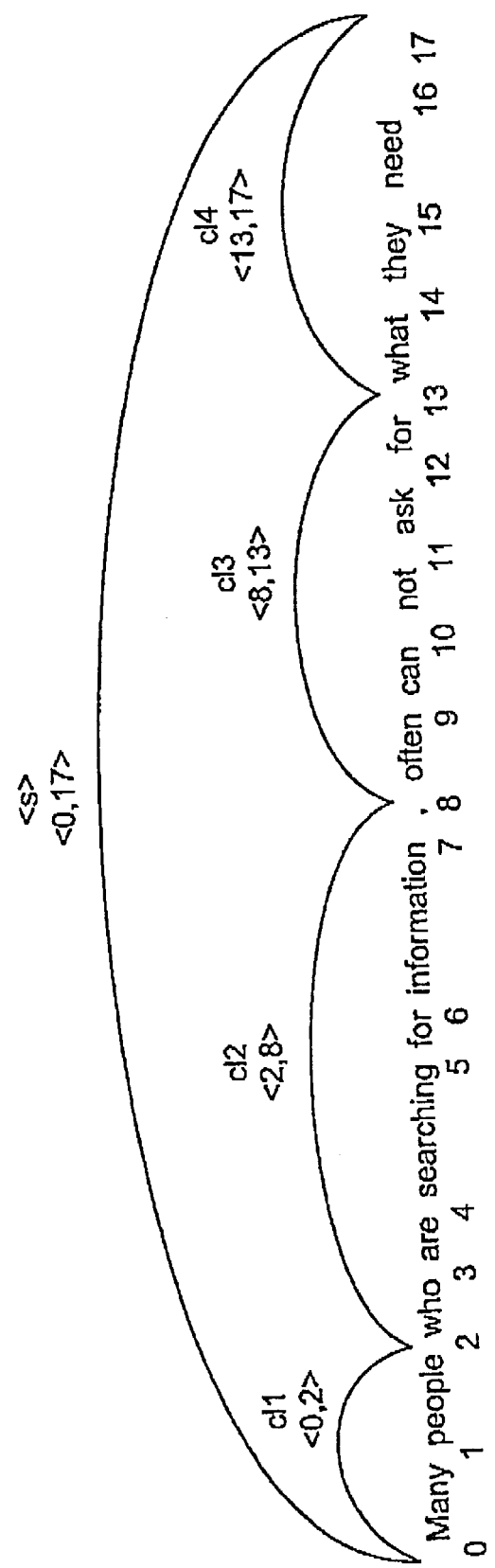
FIG. 9 is a graph illustrating the initial clause segments for the second example sentence that are the result of performing the steps in FIG. 1A.

FIG. 9 is a graph illustrating the clause segments for the second example sentence that are the result of performing the steps in FIG. 1A.

FIGS. 10A–10F, 11, and 12 provide different views of the initial clause segmentation of a third example sentence, which is an example of a multi-clausal English sentence.

In FIG. 10A and 10B, the third example sentence is shown as it is output from the pre-analyzing steps of tokenization and disambiguation, respectively. The output from disambiguation serves as input to the method illustrated in the flowchart of FIG. 1A.

In FIG. 10C and 10D, the second sentence is shown as it is output from the method illustrated in the flowchart of FIG. 1A and the rules used for each of the resulting initial clauses, respectively. The output shown in FIG. 10C serves as input to the method illustrated in the flowchart of FIG. 1B.

In FIG. 10E and 10F, the second sentence is shown as it is output from the method illustrated in the flowchart of FIG. 1B and the rules used for each of the resulting initial clauses, respectively.

FIG. 11 illustrates the derivation of initial clause segments for the second example sentence, showing iterative scanning and rule application in accordance with steps 125–129 of FIG. 1B. Each initial clause found in steps 120–124 of FIG. 1A is shown together with the result of the matching of the text elements of each initial clause with the pattern parts of the finite verb rules of FIG. 3B. For example, the third initial clause <cl3> that has been found in steps 120–124 of FIG. 1A is found to match the finite verb rule 1*a* of FIG. 3B. Thus, this clause is segmented into two initial clauses in accordance with the action associated with the finite verb rule 1*a* of FIG. 3B. This is shown in FIG. 11 as the two new initial clauses <cl3*a*> and <cl3*b*>.

Figure 12:
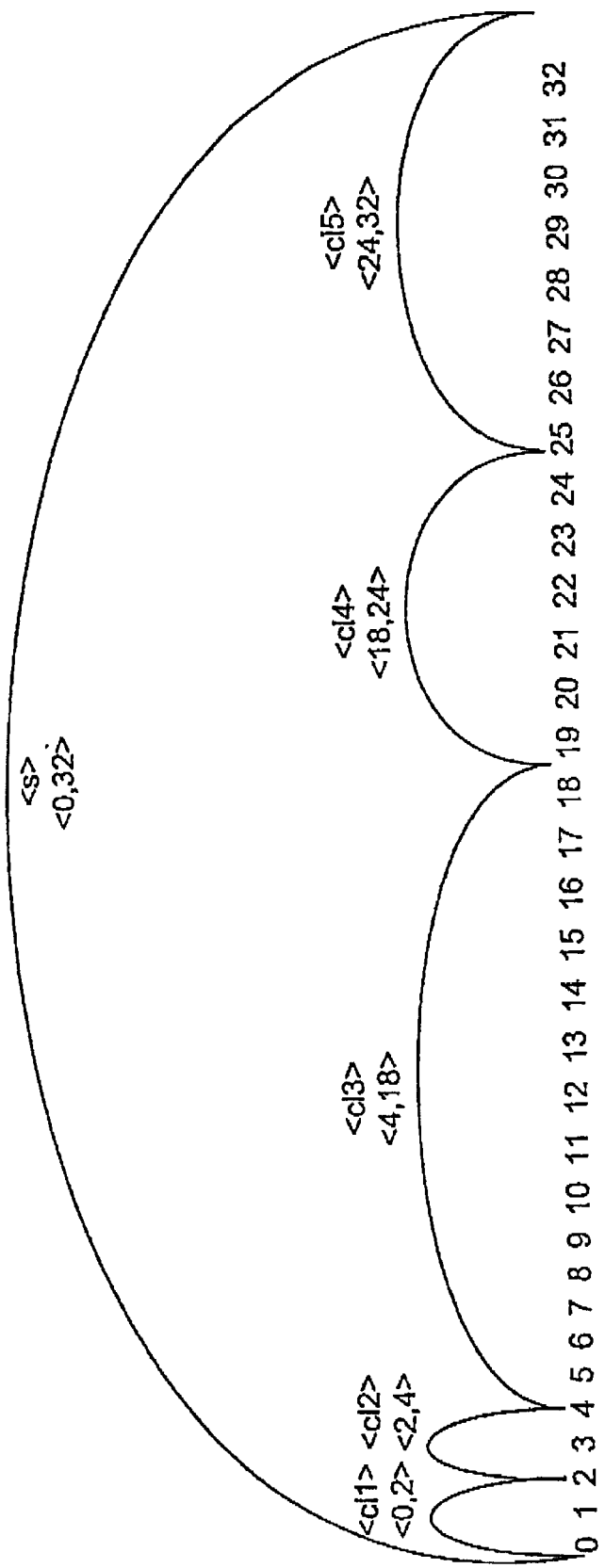
FIG. 12 is a graph illustrating the clause segments for the third example sentence that are the result of performing the steps in FIG. 1A and 1B.

FIG. 12 is a graph illustrating the clause segments for the third example sentence that is the result of performing the steps of FIG. 1A and 1B.

Figure 13:
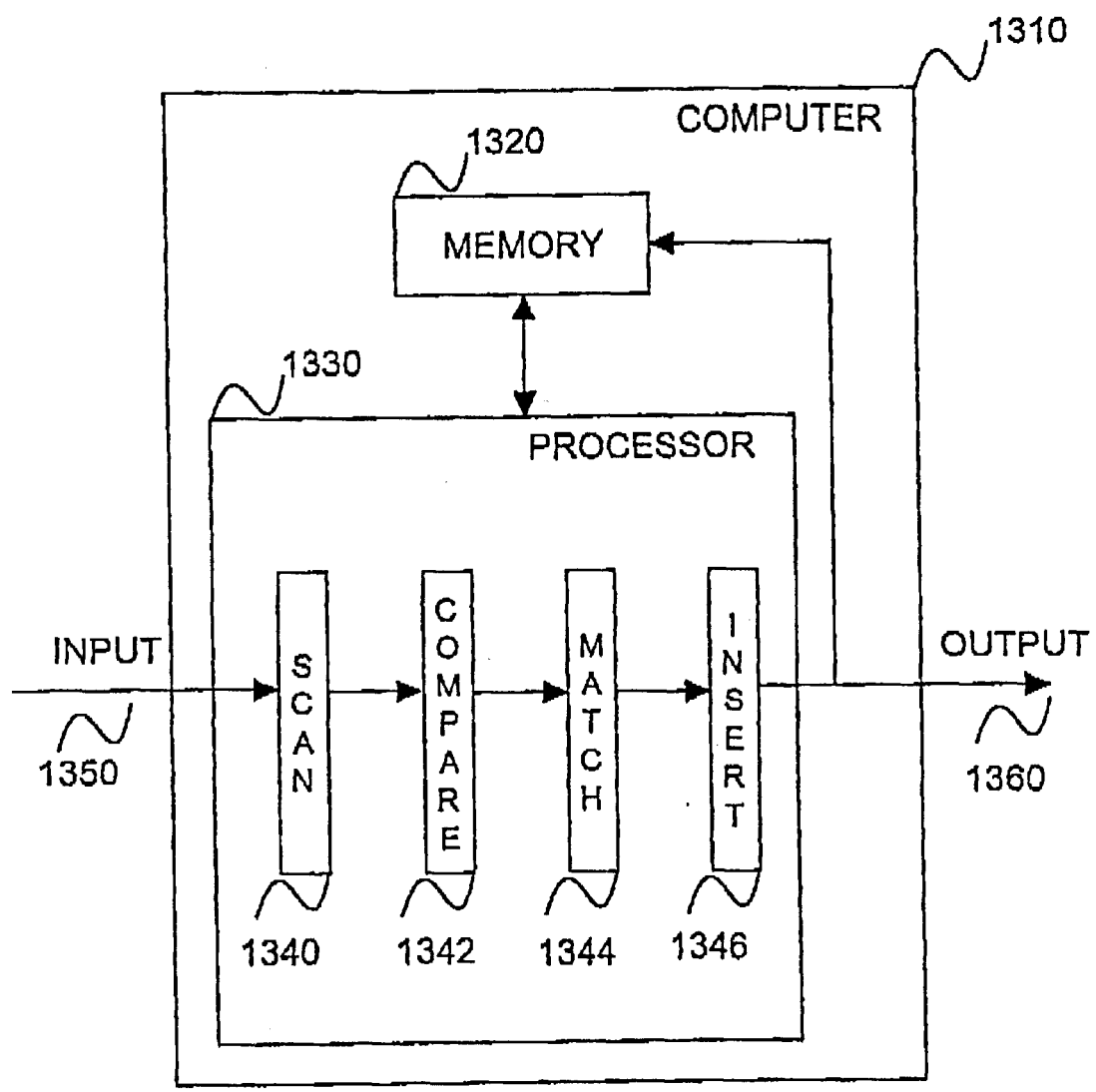
FIG. 13 shows a schematic diagram of an embodiment of an apparatus for segmentation of a stream of text elements comprising analyzed tokens into one or more initial clauses in accordance with the invention.

Turning now to FIG. 13, a schematic diagram of an embodiment of an apparatus for segmentation of a stream of text elements comprising analyzed tokens into one or more initial clauses, in accordance with the invention, is shown. The apparatus is preferably a computer 1310, or a distributed computing solution, comprising a memory 1320 and a processor 1330. Stored in the memory 1320 are a set of patterns for beginnings of initial clauses together with corresponding actions, and a set of patterns for initial clauses with multiple finite verbs together with corresponding actions. The processor 1330 is able to perform the steps of a method according to the invention. To this end the computer 1310 is provided with scanning means 1340, comparing means 1342, matching means 1344 and inserting means 1346. These means may be implemented in hardware but is preferably implemented in software. Thus, the scanning items 1340 are arranged to scan a predetermined number of consecutive text elements of said stream of text elements and to scan the text elements of an initial clause. Furthermore, the comparing means 1342 are arranged to compare the predetermined number of consecutive text elements of said stream of text elements with each pattern of the set of patterns for beginnings of initial clauses stored in the memory 1330 and to compare the text elements of an initial clause with each pattern of the set of patterns for multiple finite verbs stored in the memory 1330. The matching means 1344 are arranged to identify a match between the predetermined number of consecutive text elements and one pattern of the set of patterns for beginnings of initial clauses and to identify a match between the text elements of the initial clause and one pattern of the set of patterns for multiple finite verbs. Finally, the inserting means 1346 are arranged to insert a marker for begin initial clause into the predetermined number of consecutive text elements or into the text elements of the initial clause in response to a match made by said matching means. The marker is inserted in a position determined by the action associated with the pattern to which the match corresponds. When performing a method according to the invention the stream of text elements input 1350 to the computer 1310 is segmented into initial clauses. The output 1360 from the computer is the stream of text elements including markers for begin clause. Furthermore, the stream of text elements including markers is stored in the memory 1320.

What is claimed is:

1. A method for segmentation of a stream of text elements comprising analyzed tokens into one or more initial clauses, using a computer, comprising the steps of:

scanning, from a given position, a predetermined number of consecutive text elements of said stream of text elements;

comparing said predetermined number of consecutive text elements with each pattern of a set of patterns for beginnings of initial clauses;

identifying a beginning of an initial clause in said predetermined number of consecutive text elements if said predetermined number of consecutive text elements match one pattern of said set of patterns for beginnings of initial clauses; and repeating the steps of scanning, comparing and identifying, wherein said given position is moved at least one position forward between each repetition.

2. The method according to claim 1, further comprising the step of:

inserting a marker for begin initial clause into said predetermined number of consecutive text elements in response to an identified beginning of an initial clause in the step of identifying.

3. The method according to claim 2, wherein each pattern of said set of patterns for beginnings of initial clauses is associated with an action, and wherein, in the step of inserting, said marker is inserted into said predetermined number of consecutive text elements in accordance with the action associated with said one pattern of said set of patterns for beginnings of initial clauses.

4. The method according to claim 3, wherein, in the step of inserting, said marker is inserted into said predetermined number of consecutive text elements in a position determined by the action associated with said one pattern of said set of patterns for beginnings of initial clauses.

5. The method according to claim 4, further comprising the step of:

storing said stream of text elements, including the markers inserted in the step of inserting, in an electronic storage medium.

6. The method according to claim 2, further comprising the steps of;

indicating, for each marker for begin initial clause, the pattern of said patterns for beginnings of clauses to which the marker corresponds.

7. The method according to claim 2, wherein, in the step of inserting, a marker for end clause is inserted before every marker for begin clause, except before the first begin clause marker, and at the end of said analyzed text.

8. The method according to claim 1, further comprising the steps of:

scanning the text elements of an initial clause;

comparing said text elements of said initial clause with each pattern of a set of patterns for multiple finite verbs;

identifying a beginning of a clause in said text elements of said initial clause if said text elements of said initial clause match one pattern of said set of patterns for multiple finite verbs; and repeating the steps of scanning, comparing and identifying for each initial clause.

9. The method according to claim 8, further comprising the step of:

inserting a marker for begin initial clause into said text elements of said initial clause in response to an identified beginning of an initial clause in the step of identifying.

10. The method according to claim 9, wherein each pattern of said pattern for multiple finite verbs is associated with an action, and wherein, in the step of inserting, said marker is inserted into said text elements of said initial clause in accordance with the action associated with said one pattern of said patterns for multiple finite verbs.

11. The method according to claim 10, wherein, in the step of inserting, said marker for begin initial clause is inserted into said text elements of said initial clause in a position determined by the action associated with said one pattern of said set of patterns for multiple finite verbs.

12. The method according to claim 11, further comprising the step of:

storing said stream of text elements, including the markers inserted in the step of inserting, in an electronic storage medium.

13. The method according to claim 9, wherein, in the stop of inserting, a marker for end clause is inserted before every marker for begin clause, except before the first begin clause marker, and at the end of said analyzed text.

14. The method according to claim 1, wherein said stream of text elements comprising analyzed tokens is segmented into said initial clauses such that every token belongs to exactly one initial clause.

15. The method according to claim 1, wherein said analyzed tokens have only been assigned a unique analysis in the form of a morphosyntactic description and a lemma.

16. The method according to claim 15, wherein said morphosyntactic description comprises a part-of-speech and an inflectional form.

17. The method according to claim 1, wherein each pattern of said set of patterns comprises at most said predetermined number of text elements.

18. The method according to claim 1, wherein said predetermined number is adapted to a specific language or application.

19. The method according to claim 1, wherein a text element comprises either a token or a text structure marker.

20. The method according to claim 19, wherein the presence of a text structure marker marks the beginning or the end of some text unit, and a type of text structure marker marks a type of text unit, such as head, paragraph, sentence, clause, phrase or word.

21. The method of claim 20, wherein a text unit comprises one or more consecutive tokens.

22. The method according to claim 1, wherein a text element that is a token and occurs in a pattern may refer to:

the token itself, the lemma of the token, or the morphosyntactic description of the token.

23. An apparatus for segmentation of a stream of text elements comprising analyzed tokens into one or more initial clauses, comprising:

memory means arranged to store a set of patterns for beginnings of initial clauses;

scanning means arranged to scan a predetermined number of consecutive text elements of said stream of text elements;

comparing means arranged to compare said predetermined number of consecutive text elements of said stream of text elements with each pattern of said set of patterns for beginnings of initial clauses; and matching means arranged to identify a match between said predetermined number of consecutive text elements and one pattern of said set of patterns for beginnings of initial clauses.

24. The apparatus according to claim 23, further comprising:

inserting means arranged to insert a marker for begin initial clause into said predetermined number of consecutive text elements in response to a match made by said matching means.

25. The apparatus according to claim 24, wherein said memory means are further arranged to store an action for each pattern of said set of patterns, and wherein said inserting means are arranged to insert said marker into said predetermined number of consecutive text elements in accordance with the action associated with said one pattern.

26. The apparatus according to claim 25, wherein said inserting means are arranged to insert said marker into said predetermined number of consecutive text elements in a position determined by the action associated with said one pattern.

27. The apparatus according to claim 26, wherein said memory means are further arranged to store said stream of text elements, including the markers inserted by said inserting means.

28. The apparatus according to claim 24, wherein said inserting means are further arranged to insert a marker for the pattern of said patterns for beginnings of clauses to which the marker for begin initial clause corresponds.

29. The apparatus according to claim 23, wherein:

said memory means are further arranged to store a set of patterns for multiple finite verbs;

said scanning means are further arranged to scan the text elements of an initial clause;

said comparing means are further arranged to compare said text elements of said initial clause with each pattern of said set of patterns for multiple finite verbs; and said matching means are further arranged to identify a match between said text elements of said initial clause and one pattern of said set of for multiple finite verbs.

30. The apparatus according to claim 29, further comprising:

inserting means arranged to insert a marker for begin initial clause into said predetermined number of consecutive text elements in response to a match made by said matching means.

31. The apparatus according to claim 30, wherein said memory means are further arranged to store an action for each pattern of said sot of patterns for multiple finite verbs, and wherein said inserting means are arranged to insert said marker into said predetermined number of consecutive text elements in accordance with the action associated with said one pattern of said patterns for multiple finite verbs.

32. The apparatus according to claim 31, wherein said inserting means are arranged to insert said marker into said predetermined number of consecutive text elements in a position determined by the action associated with said one pattern of said set of patterns for multiple finite verbs.

33. A computer readable medium having computer-executable instructions for a general-purpose computer to perform the steps recited in claim 1.

34. A computer program comprising computer-executable instructions for performing the steps recited in claim 1.

* * * * *